(12) United States Patent
Matsumoto et al.

(10) Patent No.: US 9,080,672 B2
(45) Date of Patent: Jul. 14, 2015

(54) SEALING DEVICE

(71) Applicant: NOK CORPORATION, Tokyo (JP)

(72) Inventors: Daisuke Matsumoto, Kitaibaraki (JP); Hiroaki Monma, Kitaibaraki (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/378,807

(22) PCT Filed: Sep. 25, 2013

(86) PCT No.: PCT/JP2013/075795
§ 371 (c)(1),
(2) Date: Aug. 14, 2014

(87) PCT Pub. No.: WO2014/054473
PCT Pub. Date: Apr. 10, 2014

(65) Prior Publication Data
US 2015/0008648 A1    Jan. 8, 2015

(30) Foreign Application Priority Data

Oct. 3, 2012   (JP) .................................. 2012-220957

(51) Int. Cl.
*F16J 15/18*   (2006.01)
*F16J 15/08*   (2006.01)

(52) U.S. Cl.
CPC .............. *F16J 15/18* (2013.01); *F16J 15/0825* (2013.01)

(58) Field of Classification Search
CPC ................................. F16J 15/18; F16J 15/0825
USPC .................... 277/410, 421, 422, 589
See application file for complete search history.

(56) References Cited

U.S. PATENT DOCUMENTS

| 3,630,532 | A  | * | 12/1971 | Traub et al. | .................... | 277/589 |
| 7,341,258 | B2 | * | 3/2008  | Holt et al.  | ..................... | 277/584 |
| 8,702,106 | B2 | * | 4/2014  | Berckenhoff  | .................. | 277/589 |

FOREIGN PATENT DOCUMENTS

| JP | H08-193603 | A  | 7/1996  |
| JP | H11-78851  | A  | 3/1999  |
| JP | 3403694    | B2 | 5/2003  |
| JP | 2004-225778| A  | 8/2004  |
| JP | 2004-332920| A  | 11/2004 |
| JP | 2010-190314| A  | 9/2010  |
| JP | 2013-194764| A  | 9/2013  |

* cited by examiner

*Primary Examiner* — Gilbert Lee
(74) *Attorney, Agent, or Firm* — Harness, Dickey & Pierce, P.L.C.

(57) ABSTRACT

In a sealing device installed to an installation groove which is provided in an outer peripheral surface of one member among two members relatively moving, and sealing between the two members by coming into close contact with the other member which is positioned in an outer peripheral side of the installation groove and one side wall of the installation groove, the sealing device has a seal ring, a support ring having a pressing surface which comes into contact with an inner peripheral corner portion the seal ring, and a spring means which presses the support ring and the seal ring. A collapsing margin in relation to the taper surface shaped pressing surface in the support ring is normally set in an inner peripheral corner portion in the seal ring. According to the sealing device, it is possible to improve pressure resistance and sealing performance.

2 Claims, 3 Drawing Sheets

SEALING DEVICE

CROSS-REFERENCE TO RELATED APPLICATIONS

This application is a U.S. National Stage Application of International Application No. PCT/JP2013/075795 filed on Sep. 25, 2013, and published in Japanese as WO 2014/054473 A1 on Apr. 10, 2014. This application claims priority to Japanese Application No. 2012-220957 filed on Oct. 3, 2012. The entire disclosures of the above applications are incorporated herein by reference.

BACKGROUND OF THE INVENTION

1. Field of the Invention

The present invention relates to a sealing device according to a sealing technology. The sealing device according to the present invention is used, for example, in hydraulic and pneumatic equipment which accompanies a rotary motion, an oscillating motion or a reciprocating motion, or is used in various equipment which requires the sealing device for the purpose of the rotary motion, the oscillating motion or the reciprocating motion.

2. Description of the Conventional Art

A sealing device shown in FIG. 2 has been conventionally known as the sealing device for the rotary motion, the oscillating motion or the reciprocating motion. Since the sealing device generates a seal surface pressure by pressing a resin seal ring 51 which is made of PTFE to the other seal surfaces 52 and 53, the sealing device uses a spring means 54 constructed by a rubber ring such as an O-ring together (refer to Japanese Unexamined Patent Publication No. 11-78851).

However, in the case that a rigidity in a circumferential direction of the seal ring 51 is inferior, or in the case that a pressing force by the spring means 54 comes short, the seal ring 51 deforms in an inner peripheral direction according to some magnitude of a pressure (a sealing fluid pressure) acting on an outer peripheral portion of the seal ring 51, and a clearance is generated in an outer peripheral side of the seal ring 51. The clearance forms a leak route and the pressure may sometimes leak.

In order to inhibit the seal ring from deforming in the inner peripheral direction, it is thought to arrange a support ring 21 constructed by a rigid member such as a metal in an inner peripheral side of a seal ring 11 as shown as a comparative example in FIG. 3, thereby supporting the seal ring 11 from an inner peripheral side thereof by the support ring 21.

More specifically, the sealing device according to the comparative example in FIG. 3 is structured such as to be installed to an annular installation groove 3 which is provided in an outer peripheral surface 1a of one member 1 among two members 1 and 2 which are relatively moved, and come into close contact with the other member 2 which is positioned in an outer peripheral side of the installation groove 3 and one side wall of the installation groove 3, thereby sealing between two members 1 and 2. The sealing device has the resin seal ring 11 made of the PTFE, the support ring 21 constructed by the rigid member such as the metal, and a rubber ring 31 which serves as a spring means, as its constructing elements.

The seal ring 11 is provided with an outer peripheral surface 11a which slidably comes into close contact with the other member 2 and is formed into a cylindrical surface, an end surface 11b which is provided in one side in an axial direction and comes into close contact with the one side wall 3a of the installation groove 3 and is formed into an axially vertical plane shape, an inner peripheral surface 11c which is formed into a cylindrical surface shape, and an end surface 11d which is provided in the other side in the axial direction and is formed into an axially vertical plane shape, and is formed into a rectangular shape in its half cut surface. Further, a pressed surface 12 formed into a taper surface is provided in an inner peripheral corner portion which is provided in the other side in the axial direction. The inner peripheral surface 11c and the end surface 11d in the axially other side intersect at the inner peripheral corner portion.

On the other hand, the support ring 21 is provided in its outer peripheral surface with a pressing surface 22 formed into a taper surface shape in correspondence to the pressed surface 12 formed into the taper surface shape, and is structured such as to press the seal ring 11 to the other member 2 and the one side wall 3a of the installation groove 3 by being pressed by the rubber ring 31.

Therefore, on the basis of the sealing device according to the comparative example mentioned above, since the support ring 21 constructed by the rigid member such as the metal achieves a function of supporting the resin seal ring 11 from its inner peripheral side, the seal ring 11 is inhibited from deforming in the inner peripheral direction even if the pressure P is applied.

However, in the sealing device according to the comparative example mentioned above, there is further room for improvement in the following points.

More specifically, the sealing device according to the comparative example is structured, as mentioned above, such that the pressing surface 22 which is provided in the support ring 21 and is formed into the taper surface shape presses the pressed surface 12 which is provided in the seal ring 11 and is formed into the taper surface shape in the same manner, thereby pressing the seal ring 11 to the other member 2 and the one side wall 3a of the installation groove 3. Therefore, it is necessary to precisely process the pressing surface 22 and the pressed surface 12 which are both formed into the taper surface shape. If the precision of processing is not good and a contact state between both the surfaces 12 and 22 is not good, a clearance is generated between both the surfaces 12 and 22, a pressure resistance is lowered due to the clearance, and it becomes hard to secure a sealing performance.

SUMMARY OF THE INVENTION

Problem to be Solved by the Invention

The present invention is made by taking the points mentioned above into consideration, and an object of the present invention is to provide a sealing device which is provided with a seal ring made of a resin, a support ring and a spring means both constructed by a rigid member such as a metal, and is structured such that a pressing surface provided in the support ring and formed into a taper surface shape presses the seal ring, wherein a clearance is hard to be generated between the pressing surface and the seal ring, and a pressure resistance and a sealing performance can be accordingly improved.

Means for Solving the Problem

In order to achieve the object mentioned above, a sealing device according to a first aspect of the present invention is a sealing device installed to an installation groove which is provided in an outer peripheral surface of one member among two members relatively moving, and sealing between the two members by coming into close contact with the other member which is positioned in an outer peripheral side of the installation groove and one side wall of the installation groove, wherein the sealing device comprises:

a seal ring having an outer peripheral surface which slidably comes into close contact with the other member, an end surface which is provided in one side in an axial direction and comes into close contact with the one side wall of the installation groove, an inner peripheral surface, and an end surface which is provided in the other side in the axial direction, and made of a resin;

a support ring having a pressing surface which comes into contact with an inner peripheral corner portion provided in the other side in an axial direction in the seal ring and is formed into a taper surface shape, is combined with the seal ring and is constructed by a rigid member such as a metal; and a spring means which presses the support ring and the seal ring, and wherein a collapsing margin in relation to the taper surface shaped pressing surface in the support ring is normally set in an inner peripheral corner portion in the other side in the axial direction in the seal ring.

Further, a sealing device according to a second aspect of the present invention is the sealing device described in the first aspect mentioned above, wherein the inner peripheral corner portion in the other side in the axial direction in the seal ring is formed into a round shape having a circular arc shape in its cross section, thereby normally setting the collapsing margin in relation to the taper surface shaped pressing surface in the support ring.

The clearance tends to be generated between the taper surface shaped pressing surface provided in the support ring and the seal ring, in the sealing device according to the comparative example of FIG. 3 mentioned above, since the taper surface shaped pressed surface is provided in the seal ring, and alignment between a taper angle of the pressing surface and a taper angle of the pressed surface is required. In other words, the collapsing margin in relation to the pressing surface is not set in the seal ring. On the contrary, the present invention is structured such that the collapsing margin in relation to the pressing surface of the support ring is normally set in the inner peripheral corner portion of the seal ring. In the case that the collapsing margin is normally set, there is no room for generation of the clearance.

In order to make the collapsing margin be normally set, it is preferable to form the inner peripheral corner portion of the seal ring into the round shape having the circular arc shape in its cross section and make the round shape normally interfere with the taper surface shaped pressing surface.

Effect of the Invention

The present invention achieves the following effects.

More specifically, in the present invention, since the collapsing margin in relation to the pressing surface of the support ring is normally set in the inner peripheral corner portion of the seal ring as described above, the clearance is not generated between the inner peripheral corner portion of the seal ring and the pressing surface of the support ring. Therefore, it is possible to inhibit the pressure resistance and the sealing performance from being lowered by the generation of the clearance, and it is possible to improve the pressure resistance and the sealing performance.

Further, in the present invention, since the support ring supports the seal ring from its inner peripheral side in conjunction with the above structure, the seal ring is inhibited from deforming in the inner peripheral direction even if the pressure is applied. Therefore, the clearance is hard to be generated in the outer peripheral side of the seal ring, and it is possible to improve the sealing performance.

DETAILED DESCRIPTION OF PREFERRED EMBODIMENTS

The following embodiments are included in the present invention.

(1) The sealing device of the present invention is a combined seal of a seal ring (a PTFE ring), a support ring (a metal ring) and a spring means (a rubber ring).

Figure 3:
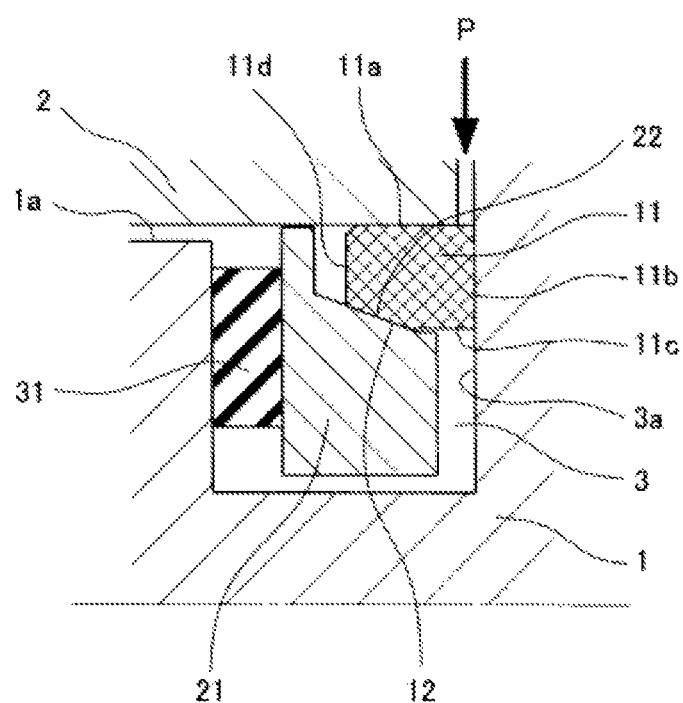
FIG. 3 is a half cut cross sectional view of a sealing device according to a comparative example.

(2) The collapsing is applied to the support ring taper portion by changing the cross sectional shape of the seal ring in the comparative example of FIG. 3 from the inner peripheral taper portion to a corner portion R.

(3) A wedge effect is generated by applying the collapsing to the seal ring and the support ring outer peripheral taper portion and accordingly setting the seal ring and the support ring outer peripheral taper portion to a normally contact state, so that the seal ring can be pressed to the other seal surface.

(4) The wedge effect is normally generated by changing the seal ring cross sectional shape and setting the support ring taper portion to have the collapsing, in comparison with the comparative example of FIG. 3, thereby pressing the PTFE ring to the other seal surface. As a result, any gap is not generated, and it is possible to secure the sealing performance.

Embodiment

Next, a description will be given of an embodiment according to the present invention with reference to the accompanying drawing.

Figure 1:
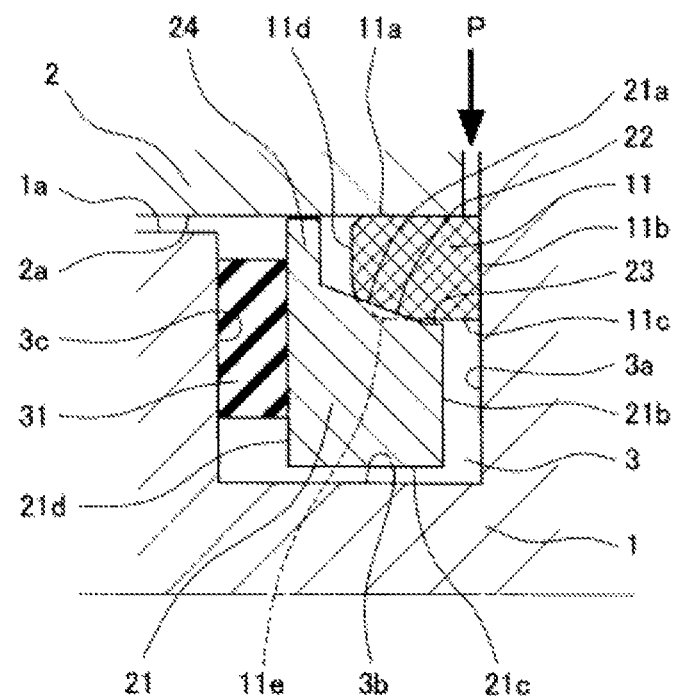
FIG. 1 is a half cut cross sectional view of a sealing device according to an embodiment of the present invention.
Figure 2:
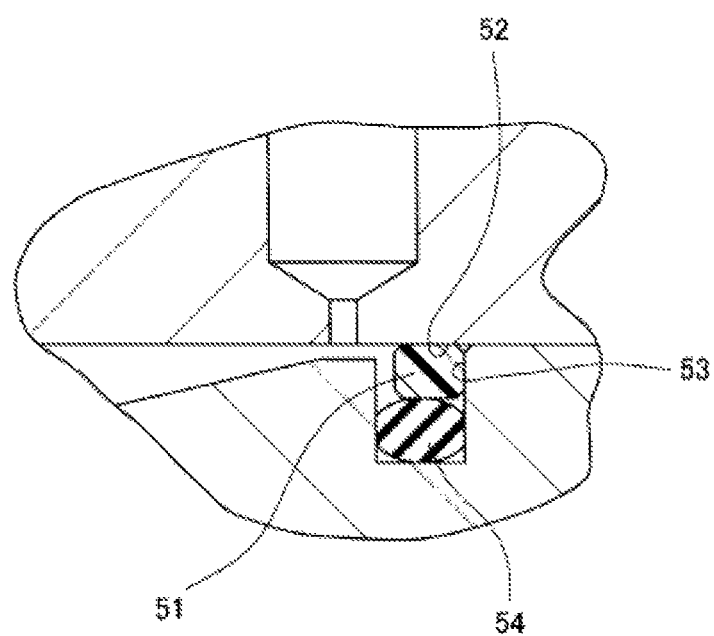
FIG. 2 is a half cut cross sectional view of a sealing device according to a prior art.

FIG. 1 shows a sealing device according to an embodiment of the present invention. More specifically, the sealing device is structured such as to seal between two members 1 and 2 by being installed to an annular installation groove 3 which is provided in an outer peripheral surface 1a of one member 1 among two members 1 and 2 relatively moving (relatively rotating or relatively oscillating), and coming into close contact with the other member 2 positioned in an outer peripheral side of the installation groove 3 and one side wall 3a of the installation groove 3. The sealing device has a seal ring 1 which is made of a resin such as PTFE, a support ring 21 which is constructed by a rigid member such as a metal, and a rubber spring 31 which serves as a spring means, as its constructing elements. The installation groove 3 is formed into a rectangular shape in its half cut cross sectional surface.

The seal ring 11 is provided with an outer peripheral surface 11a which is formed into a cylindrical surface shape, an end surface 11b which is provided in one side in an axial direction and is formed into an axially vertical plane shape, an inner peripheral surface 11c which is formed into a cylindrical surface shape, and an end surface 11d which is provided in the other side in the axial direction and is formed into an axially vertical plane shape. The seal ring 11 is formed into a rectangular shape or an approximately rectangular shape in its half cut cross sectional surface, slidably comes into close contact with an inner peripheral surface 2a of the other member 2 by the outer peripheral surface 11a, and comes into close contact with the one side wall 3a of the installation groove 3 by the end surface 11b in the axially one side.

The support ring 21 is provided with an outer peripheral surface 21a, an end surface 21b which is provided in one side in an axial direction and is formed into an axially vertical plane shape, an inner peripheral surface 21c which is formed into a cylindrical surface shape, and an end surface 21d which is provided in the other side in the axial direction and is formed into an axially vertical plane shape. The support ring 21 is formed into a rectangular shape or an approximately rectangular shape in its half cut cross sectional surface, and is assembled into an inner peripheral side of the seal ring 11. However, the support ring 21 is provided in its outer peripheral surface 21a with a pressing surface 22 which comes into contact with an inner peripheral corner portion 11e which is provided in the other side in an axial direction and is formed into a taper shape. The inner peripheral surface 11c in the seal ring 11 and the end surface 11d in the axially other side intersect at the inner peripheral corner portion 11e. Further, a cylindrical straight portion 23 is continuously provided in one side in an axial direction of the pressing surface 22 formed into the taper surface shape, and a flange-like protruding portion 24 is provided in the other side in the axial direction in an opposite side so as to be directed to an outer peripheral direction.

The rubber ring 31 is also formed into a rectangular shape or an approximately rectangular shape in its half cut cross sectional surface, is interposed in a compressed state between the end surface 21d in the axially other side of the support ring 21 and the other side wall 3c of the installation groove 3, presses the support ring 21 toward one side in the axial direction with a repulsive force, and presses the seal ring 11 toward the inner peripheral surface 2a of the other member 2 and the one side wall 3a of the installation groove 3 via the tapered pressing surface 22 of the support ring 21.

Further, the sealing device is provided with a particular structure in the inner peripheral corner portion 11e in the axially other side of the seal ring 11. The particular structure normally sets a collapsing margin in relation to the tapered pressing surface 22 of the support ring 21, and is not provided in the sealing device according to the comparative example in FIG. 3. More specifically, the structure normally setting the collapsing margin in relation to the tapered pressing surface 22 of the support ring 21 is provided by forming the inner peripheral corner portion 11e in the axially other side of the seal ring 11 into a round shape having a circular arc shape in its cross section, as shown by a dotted line on the drawing.

For the particular structure, an inner diameter of the seal ring 11 is set to be larger than a minimum outer diameter of the tapered pressing surface 22 and be smaller than a maximum outer diameter, and a round shape (which may be also called as an interference portion or an overlap portion) is provided in the inner peripheral corner portion 11e in the axially other side of the seal ring 11 having the inner diameter mentioned above. The round shape normally interferes with the tapered pressing surface 22 of the support ring 21 and is formed into a circular arc shape in its cross sectional surface.

In the sealing device having the structure mentioned above, since the collapsing margin in relation to the tapered pressing surface 22 of the support ring 21 is normally set in the inner peripheral corner portion 11e in the axially other side of the seal ring 11, any clearance is not generated between the inner peripheral corner portion 11a of the seal ring 11 and the pressing surface 22 of the support ring 21. Therefore, it is possible to inhibit the pressure resistance from being lowered and inhibit the sealing performance from being lowered, due to the generation of the clearance, and it is possible to improve the pressure resistance and the sealing performance.

Further, in the sealing device mentioned above, since the support ring 21 supports the seal ring 11 from its inner peripheral side in conjunction with the above structure, it is possible to inhibit the seal ring 11 from deforming in the inner peripheral direction even if the pressure P is applied. Therefore, the clearance is hard to be generated in the outer peripheral side of the seal ring 11, and it is possible to improve the sealing performance.

In the sealing device according to the embodiment mentioned above, the following descriptions can be added.

(1) A diametrical width ((outer diameter−inner diameter)/2) of the seal ring 11 is preferably set to a range between 35 and 45% of a diametrical distance between the bottom wall 3b of the installation groove 3 and the inner peripheral surface 2a of the other member 2.

(2) An axial width of the seal ring 11 is preferably set to a range between 40 and 50% of an axial width of the installation groove 3.

(3) An outer diameter of the seal ring 11 is preferably set to a range between 0 and 0.5 mm/diameter in a fastening margin in relation to the inner peripheral surface 2a of the other member 2 (an outer diameter of the installation groove).

(4) The round shape provided in the inner peripheral corner portion 11e in the axially other side of the seal ring 11 is preferably set to a dimension which can secure the collapsing equal to or more than 0.1 mm, in relation to the tapered pressing surface 22 of the support ring 21.

(5) A diametrical width ((outer diameter−inner diameter)/2) of the end surface 21b in the axially one side of the support ring 21 is preferably set to a range between 50 and 60% of the diametrical distance between the bottom wall 3b of the installation groove 3 and the inner peripheral surface 2a of the other member 2.

(6) An axial width of the support ring 21 is preferably set to a range between 50 and 60% of the axial width of the installation groove 3.

(7) A gap at least 0.05 mm/diameter is preferably set between the support ring 21 and the other member 2.

(8) A diametrical width ((outer diameter−inner diameter)/2) of the rubber ring 31 is preferably set to a range between 55 and 65% of the diametrical distance between the bottom wall 3b of the installation groove 3 and the inner peripheral surface 2a of the other member 2.

(9) An axial width of the rubber ring 31 is preferably set to a range between 40 and 50% of the axial width of the installation groove 3.

(10) A filling rate of the rubber ring 31 is preferably set to be equal to or less than 100%.

(11) The material or the resin seal ring 11 may be constituted by a hard resin such as a nylon, in addition to the PTFE.

(12) The material of the support ring 21 may be constituted by any material as long as the material is iron materials, SUS, and metal materials.

(13) The material of the rubber ring 21 may be constituted by any material as long as the material is rubber-like elastic materials such as NBR, FKM and EPDM.

(14) The rubber ring 31 may be constituted by the other spring means such as a metal spring in place of the rubber ring.

What is claimed is:
1. A sealing device installed to an installation groove which is provided in an outer peripheral surface of a first member among two relatively moving members, and sealing between said two members by coming into close contact with a second member among the two members and one side wall of said installation groove, the second member being positioned on an outer peripheral side of said installation groove,
   wherein the sealing device comprises:
     a resin seal ring having:
       an outer peripheral surface which slidably comes into close contact with said second member,
       a first end surface which is provided on one side of the seal ring in an axial direction and comes into close contact with the one side wall of said installation groove,
       an inner peripheral surface, and
       a second end surface which is provided on the other side of the seal ring in the axial direction;
     a rigid metal support ring combined with said seal ring, said support ring having a tapered pressing surface which comes into contact with an inner peripheral corner of said seal ring, the inner peripheral corner being provided at the other side in the axial direction of said seal ring; and
     an elastomeric spring sandwiched between another side wall of said installation groove and said support ring and presses said support ring and the seal ring,
     wherein a collapsing margin in relation to said tapered pressing surface of said support ring is normally set in the inner peripheral corner of said seal ring.

2. The sealing device according to claim 1, wherein the inner peripheral corner portion of said seal ring is formed into a rounded shape having a circular arc shape in cross section, thereby normally setting the collapsing margin in relation to said tapered pressing surface of said support ring.

* * * * *